US008826377B2

(12) United States Patent
Lou et al.

(10) Patent No.: US 8,826,377 B2
(45) Date of Patent: Sep. 2, 2014

(54) AUTHENTICATION METHOD EMPLOYED BY PORTABLE ELECTRONIC DEVICE, ASSOCIATED CONTROLLER, HOST COMPUTER HAVING STORAGE MEDIUM STORING ASSOCIATED COMPUTER PROGRAM, AND MACHINE-READABLE MEDIUM STORING ASSOCIATED COMPUTER PROGRAM

(75) Inventors: Wenzhong Lou, Sunnyvale, CA (US); Paul Chiopo U, San Jose, CA (US)

(73) Assignee: Silicon Motion Inc., Jhubei, Hsinchu County (TW)

( * ) Notice: Subject to any disclaimer, the term of this patent is extended or adjusted under 35 U.S.C. 154(b) by 818 days.

(21) Appl. No.: 12/566,628

(22) Filed: Sep. 24, 2009

(65) Prior Publication Data

US 2011/0072491 A1    Mar. 24, 2011

(51) Int. Cl.
G06F 7/04    (2006.01)

(52) U.S. Cl.
USPC ............................ 726/3; 709/229; 380/277

(58) Field of Classification Search
USPC ................................................... 726/3
See application file for complete search history.

(56) References Cited

U.S. PATENT DOCUMENTS

| 6,034,618 A * | 3/2000 | Tatebayashi et al. ........... 340/5.8 |
| 6,145,006 A * | 11/2000 | Vishlitsky et al. ............. 709/229 |
| 2004/0006713 A1* | 1/2004 | Minemura ...................... 713/201 |
| 2005/0129243 A1* | 6/2005 | Bousis ........................... 380/277 |
| 2006/0117176 A1* | 6/2006 | Sasaki et al. ................... 713/155 |
| 2007/0061566 A1* | 3/2007 | Bailey et al. ................... 713/151 |

* cited by examiner

Primary Examiner — Carl Colin
Assistant Examiner — Syed Zaidi
(74) Attorney, Agent, or Firm — Winston Hsu; Scott Margo

(57) ABSTRACT

An authentication method employed by a portable electronic device includes: generating first data; deriving reference data according to the first data; receiving a second data from a host computer; and determining whether the host computer is permitted to access the portable electronic device according to the reference data and the second data.

20 Claims, 3 Drawing Sheets

AUTHENTICATION METHOD EMPLOYED BY PORTABLE ELECTRONIC DEVICE, ASSOCIATED CONTROLLER, HOST COMPUTER HAVING STORAGE MEDIUM STORING ASSOCIATED COMPUTER PROGRAM, AND MACHINE-READABLE MEDIUM STORING ASSOCIATED COMPUTER PROGRAM

BACKGROUND OF THE INVENTION

1. Field of the Invention

The present invention relates to an authentication method, and more particularly, to an authentication method employed by a portable electronic device; an associated controller; a host computer having a storage medium storing an associated computer program; and a machine-readable medium storing an associated computer program.

2. Description of the Prior Art

To ensure the security of data stored in an Universal Serial Bus (USB) Mass Storage device or other personal storage devices, some standards, such as IEEE 1667 and U3 technology, have been provided for secure authentication and creation of trust between a secure host and a directly attached Transient Storage Device (TSD). However, these standards need much computation time and memory space; furthermore, these standards require additional hardware, or need to be executed by a faster and more powerful processor rather than a low-end micro-processor. Therefore, the cost is increased.

Hence, how to use a low-end micro-processor to implement an efficient authentication method between a host and a transient storage device has become an important topic in the field.

SUMMARY OF THE INVENTION

It is therefore an objective of the present invention to provide an authentication method employed by a portable electronic device; an associated controller; a host computer having a storage medium storing an associated computer program; and a machine-readable medium storing an associated computer program, to solve the above-mentioned problems.

According to one embodiment of the present invention, an authentication method employed by a portable electronic device comprises: generating first data; deriving reference data according to the first data; receiving second data from a host computer; and determining whether the host computer is permitted to access the portable electronic device according to the reference data and the second data.

According to another embodiment of the present invention, a controller of a portable electronic device comprises a first circuit, a second circuit and a third circuit. The first circuit is utilized for generating first data. The second circuit is coupled to the first circuit, and is utilized for deriving reference data according to the first data. The third circuit is coupled to the second circuit, and is utilized for receiving second data from a host computer and determining whether the host computer is permitted to access the portable electronic device according to the reference data and the second data.

According to another embodiment of the present invention, a host computer comprises a storage medium storing a computer program utilized for accessing a portable electronic device, wherein when the computer program is executed by the host computer, the host computer operates to perform the following steps: receiving first data from the portable electronic device; deriving authentication data according to the first data; generating second data according to the authentication data; and transmitting the second data to the portable electronic device, wherein the second data are referenced by the portable electronic device to determine whether the host computer is permitted to access the portable electronic device.

According to another embodiment of the present invention, a machine-readable medium stores a computer program which, when executed by a processor, enables the processor to perform the following steps: receiving first data from a portable electronic device; deriving authentication data according to the first data; generating second data according to the authentication data; and transmitting the second data to the portable electronic device, wherein the second data are referenced by the portable electronic device to determine whether a host computer is permitted to access the portable electronic device.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
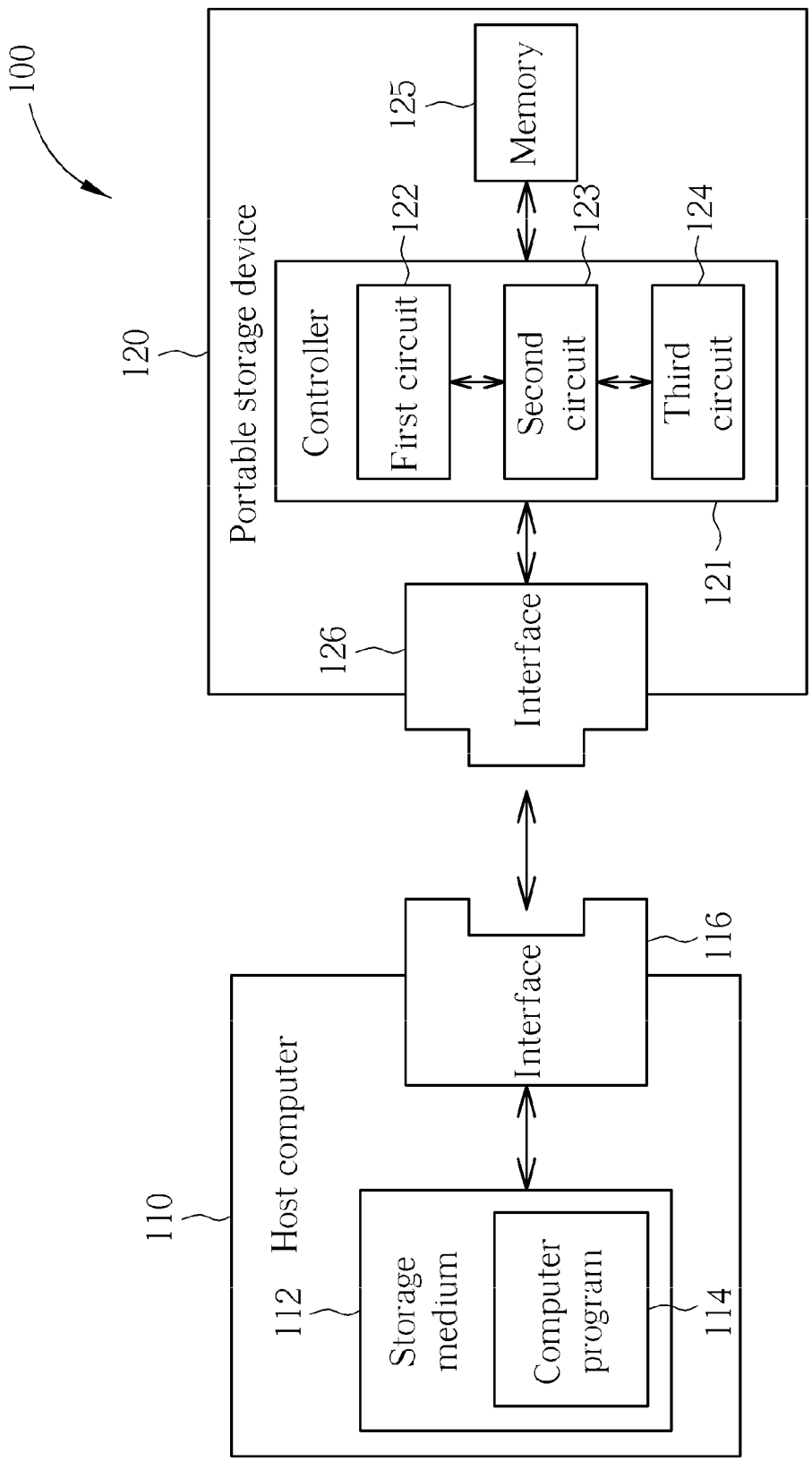
FIG. 1 is a diagram illustrating a data accessing system according to one embodiment of the present invention.

Please refer to FIG. 1. FIG. 1 is a diagram illustrating a data accessing system 100 according to one embodiment of the present invention. As shown in FIG. 1, the data accessing system includes a host computer 110 and portable electronic device (in this embodiment, a portable storage device 120 serves as the portable electronic device), where the host computer 110 includes a storage medium 112 storing a computer program 114 and an interface 116; the portable storage device 120 includes a controller 121, a memory 125 and an interface 126; and the controller 121 includes a first circuit 122, a second circuit 123 and a third circuit 124. Please note that the function of the first circuit 122, the second circuit 123 and the third circuit 124 can be implemented by software or firmware. Thus, the first circuit 122, the second circuit 123 and the third circuit 124 can be replaced by software or firmware and can be omitted. In addition, the storage medium 112 can be a hard disk, a memory (e.g. flash memory) or other storage medium; the portable storage device 120 can be an Universal Serial Bus (USB) Mass Storage; the computer program 114 is an USB Mass Storage driver; and the interfaces 116 and 126 can be USB interfaces.

Figure 2A:
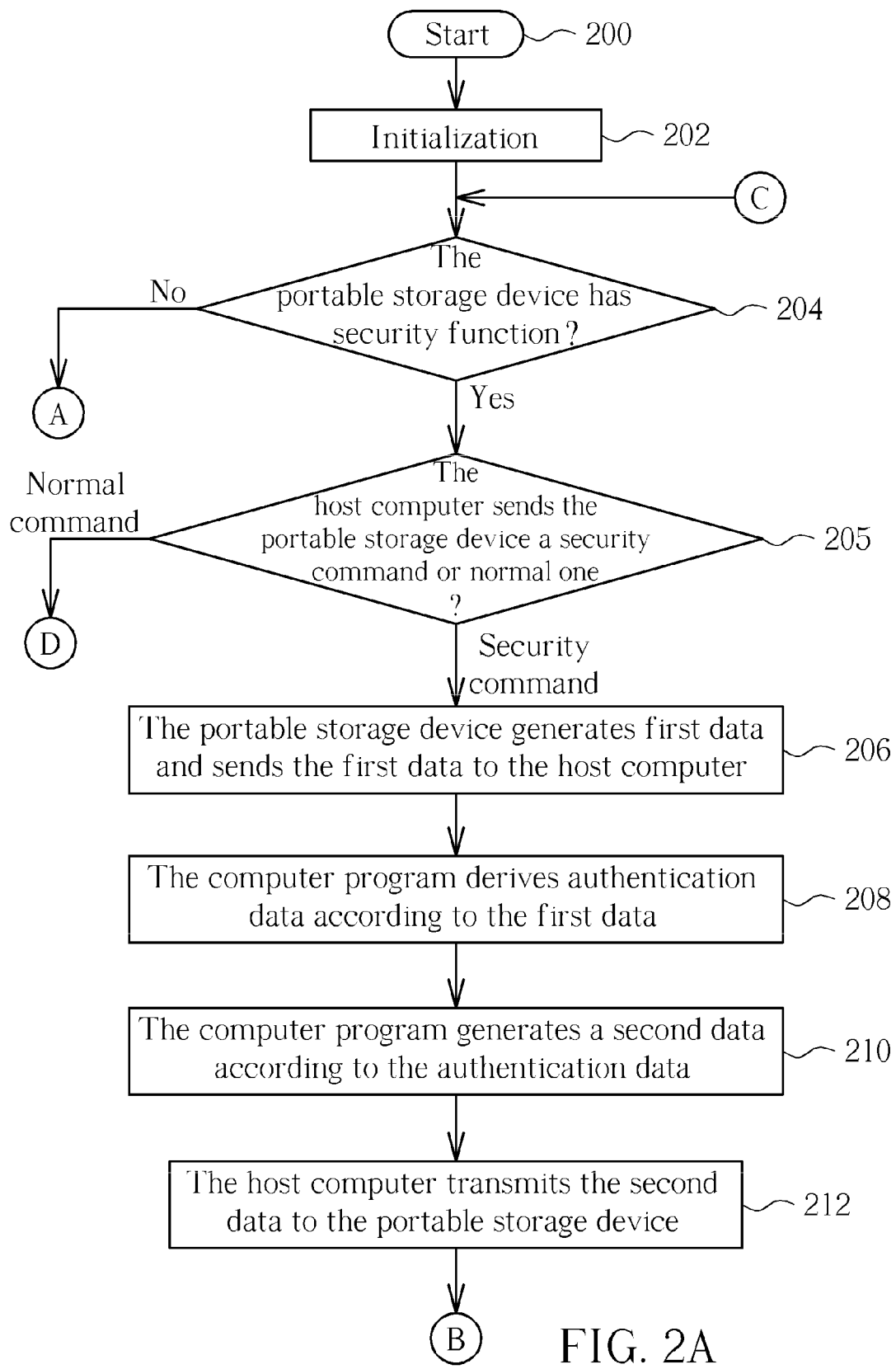
FIGS. 2A and 2B are diagrams illustrating an authentication method according to one embodiment of the present invention.
Figure 2B:
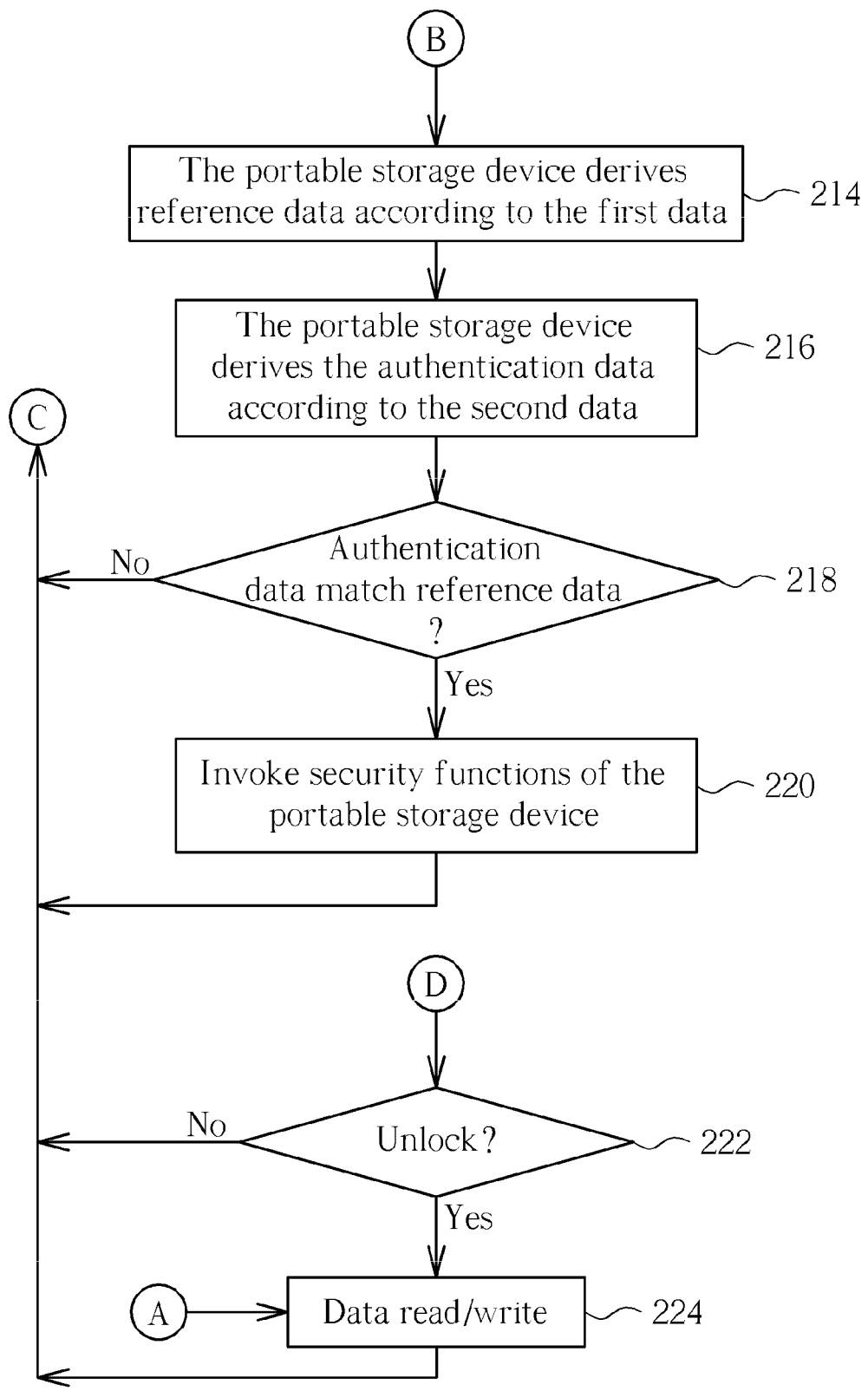

Please refer to FIG. 1, FIGS. 2A and 2B together. FIGS. 2A and 2B is a diagram illustrating an authentication method according to one embodiment of the present invention. Please note that, provided the result is substantially the same, the steps are not limited to be executed according to the exact order shown in FIGS. 2A and 2B. Referring to the flowchart shown in FIGS. 2A and 2B, the operations of the data accessing system are described as follows:

In Step 200, the portable storage device 120 is electrically connected to the host computer 110. Then, in Step 202, an initialization of the data accessing system is performed. In Step 204, the host computer 110 detects if the portable storage device 120 has a security function. If the portable storage device 120 has the security function, the host computer 110 executes the computer program 114 and the flow enters Step 205; if the portable storage device 120 does not have the security function, the flow enters Step 224 to directly access the data stored in the memory 125.

In Step 205, the host computer 110 executes the computer program 114 and sends commands to the portable storage device 120. The host computer 110 determines that the command is a security command or a normal one. The security commands are related to security function or security setting, for instance: lock/unlock/set-password/clear-password, etc. The others are normal commands, including: data read/write/erase/status-inquire, etc. If the host computer 110 sends a security function command, the flow enters Step 206 and begins security function process. If the host computer 110 sends a normal command, the flow enters Step 222.

In Step 206, the first circuit 122 of the portable storage device generates a first data and sends the first data to the host computer 110. In this embodiment, the first data is generated randomly, i.e. random data. Then, in Step 208, the host computer 110 receives the first data from the portable storage device 120, and the computer program 114 derives authentication data according to the received first data. In one embodiment, the computer program 114 can select a portion of the first data to serve as seed data, and then generate the authentication data according to the seed data. For example, assuming that the first data are random data InData[m] having 512 bytes, and the seed data are 16 bytes, the seed data InSeed[i] can be determined (but not limited to this method) as follows:

$$InSeed[i] = InData\left[i<<5 + 16 + \left(\sum_{k=i<<5}^{(i<<5)+15} InData[k]\right) \text{Mod} 16\right] \quad (1)$$

where i=0, 1, 2, ..., 15.

Referring to the above formula (1), the seed data InSeed[i] are 16 bytes and are selected from the first data InData[m], and particularly, positions of the selected portion (selected bytes) of the first data InData[m] are determined according to contents of the first data InData[m]. In other words, the computer program 114 determines the seed data InSeed[i] according to the random data InData[m] and the formula (1). Each byte of the seed data InSeed[i] is selected from a byte of the random data InData[m]. The formula (1) defines which byte of the random data InData[m] is the particular $i^{th}$ selected from. In addition, the authentication data AData[k] can be determined (but not limited to this method) as follows:

$$AData[k]=(Nibble\_Swap(InSeed[k])*3-k) \quad (2)$$

where k=0, 1, 2, ..., 15.
where Nibble_Swap is a well known nibble swap operation. In other words, the computer program 114 reorders the content of the seed data InSeed[k], byte by byte, to generate the AData[k]. The above formula (2) is used to increase the complexity between the authentication number and the seed data, and is further used to increase the complexity between the authentication number and the first data.

It is noted that the above steps of hash algorithm for generating the authentication data merely comprise an embodiment of the present invention. As long as the authentication data is generated according to the first data, the authentication data can be generated by other methods.

In Step 210, the computer program 114 generates a second data according to the authentication data. In one embodiment, the computer program 114 generates random data RanData[n], selects a portion of the random data RanData[n], and replaces the selected portion of the random data RanData[n] by the authentication data AData[k] to generate the second data OutData[n]. In one embodiment, the random data RanData[n] should be different from the first data (random data InData[m]) for further increasing the complexity and the security. For example, assuming that the random data RanData[n] are 512 bytes, the second data OutData[n] can be determined (but not limited to this method) as follows:

$$ADAddr[i] = InData\left[\left(\sum_{k=0}^{31} InData[k<<4+i]\right) \text{Mod} 32\right] \quad (3)$$

where i=0, 1, ..., 15, and address data ADAddr[i] indicates the addresses of the selected portion of the random data RanData[n]. The addresses of the selected portion are derived from the content of the random data InData[m].

$$OutData[i]=RanData[i] \quad (4)$$

where i=0, 1, ..., 511. Before replacing the selected portion of the random data RanData[n] by the authentication data AData[k], the second data OutData[n] is initially configured as the random data RanData[n].

$$OutData[i+ADAddr[i]<<4]=AData[i] \quad (5)$$

where i=0, 1, ..., 15. The addresses of selected portion of the second data OutData[n] are determined according to the address data ADAddr[i], and the selected portion of the second data OutData[n] are replaced by the authentication data AData[i]. The second data OutData[n] are generated accordingly.

Referring to the above formulae (3)-(5), a portion of the random data (RanData[i+ADAddr[i]<<4]) is selected, and is replaced by the authentication data AData[i]. In particular, positions of the selected portion (selected bytes) of the random data are determined by values of the first data InData[m]. In order to increase the security and the complexity, the second data RanData[n] could be also involved in to determine the positions of the selected portion (selected bytes) above.

It is noted that the above steps of hash algorithm for generating the second data merely comprise an embodiment of the present invention. As long as the authentication data is embedded into a random data to generate the second data, the second data OutData[n] can be generated by other methods.

In Step 212, the host computer 110 transmits the second data to the portable storage device 120, where the second data are referenced by the portable storage device 120 to determine whether the host computer 110 is permitted to access the portable storage device 120 security functions.

Then, in Step 214, the second circuit 123 of the portable storage device 120 derives reference data RefData[i] according to the first data generated in Step 206, where the step of generating the reference data RefData[i] is the same as the step of generating the authentication data AData [i] described in Steps 208. That is, if the authentication data AData[i] are generated by the formulae (1) and (2), the reference data RefData[i] are also generated in a similar way, i.e. generated by the formulae (1)' and (2)'.

$$InSeed'[i] = InData\left[i << 5 + 16 + \left(\sum_{k=i<<5}^{(i<<5)+15} InData[k]\right) \mathrm{Mod}\, 16\right] \quad (1)'$$

where i=0, 1, 2, . . . , 15.

$$\mathrm{RefData}[k]=(\mathrm{Nibble\_Swap}(\mathrm{InSeed'}[k])*3-k) \quad (2)'$$

where k=0, 1, 2, . . . , 15.

In Step 216, the third circuit 124 of the portable storage device 120 derives the authentication data AData[i] according to the second data OutData[n] received from the host computer 110. For example, if the authentication data AData[i] are embedded into the random data RanData[n] according to the formulae (3)-(5), the portable storage device 120 derives the authentication data AData[i] by selecting a portion of the second data. That is, the controller 121 generates the address data ADAddr[i] according to the formula (3) and the first data InData[i]. Then the controller derives (selects) a portion of the second data OutData[i] to generate the derived authentication data as follow:
OutData[i+ADAddr[i]<<4] serve as the derived authentication data, where i=0, 1, . . . , 15.

Then, in Step 218, the third circuit 124 of the portable storage device 120 determines whether the host computer 110 is permitted to access the portable storage device 120 security functions according to the reference data RefData[i] and the authentication data AData[i] derived from the second data OutData[n] (i.e. the derived authentication data). In detail, the third circuit 124 determines whether the host computer 110 is permitted to access the portable storage device 120 security functions by comparing the reference data RefData[i] and the authentication data AData[i] derived from the second data OutData[n]. When the authentication data AData[i] derived from the second data OutData[n] match the reference data RefData[i], the third circuit 124 permits the host computer 110 to access the portable storage device 120 security functions, and the flow enters Step 220; when the authentication data AData[i] derived from the second data OutData[n] do not match the reference data RefData[i], the third circuit 124 blocks the host computer 110 from accessing the portable storage device 120 security functions, and the flow goes back to Step 204.

In Step 220, the host computer 110 invokes the security functions of the portable storage device 120, for example: lock, unlock, set-password or clear-password etc., and the flow goes back to Step 204. In Step 222, the host computer 110 detects whether the portable storage device 120 is unlocked or locked. If the portable storage device 120 is unlocked (temporarily closing the security functions of the portable storage device 120), the flow enters Step 224 and the host computer 110 can access the data stored in the memory 125; if the portable storage device 120 is locked, the host computer 110 can not access the data stored in the memory 125, the flow goes back to Step 204.

Briefly summarized, in the present invention, when the portable storage device is electrically connected to the host computer, the portable storage device and the host computer generate the reference data and the authentication data, respectively, and the portable storage device compares the reference data and the authentication data to determine if the host computer is permitted to access the portable storage device. In addition, several additional steps are provided to increase the security of the data transmission between the portable storage device and the host computer.

Those skilled in the art will readily observe that numerous modifications and alterations of the device and method may be made while retaining the teachings of the invention.

What is claimed is:

1. An authentication method employed by a portable electronic device, comprising:
generating first data;
deriving reference data according to the first data;
receiving second data from a host computer; and
determining whether the host computer is permitted to access data stored in the portable electronic device according to the reference data and the second data;
wherein the step of deriving reference data according to the first data comprises:
generating seed data by using formula $$InSeed'[i] = InData\left[i << C1 + C2 + \left(\sum_{k=i<<C1}^{(i<<C1)+C2} InData[k]\right) \mathrm{Mod}(C2)\right],$$

wherein InSeed'[i] is the seed data, InData[ ] is the first data, C1 is a constant, C2 is a number of bytes of the seed data, and i=0, 1, 2, . . . , (C2-1); and
generating the reference data according to the seed data.

2. The authentication method of claim 1, wherein the step of generating the reference data according to the seed data comprises:
generating the reference data by using formula
RefData[k]=(Nibble_Swap(InSeed'[k])*C3-k),
wherein RefData[k] is the reference data, C3 is a constant, Nibble_Swap( )is a nibble swap operator, and k =0, 1, 2, . . . , (C2-1).

3. The authentication method of claim 1, wherein the step of determining whether the host computer is permitted to access the portable electronic device comprises:
deriving an authentication data according to the second data; and
determining whether the host computer is permitted to access the portable electronic device by comparing the authentication data and the reference data.

4. The authentication method of claim 3, wherein the step of determining whether the host computer is permitted to access the portable electronic device by comparing the authentication data and the reference data comprises:
when the authentication data match the reference data, permitting the host computer to access the portable electronic device; and
when the authentication data do not match the reference data, blocking the host computer from accessing the portable electronic device.

5. The authentication method of claim 3, wherein the step of deriving the authentication data according to the second data comprises:
selecting a portion of the second data to serve as the authentication data.

6. The authentication method of claim 5, wherein positions of the selected portion of the second data are determined by contents of the first data.

7. The authentication method of claim 5, wherein the step of determining whether the host computer is permitted to access the portable electronic device by comparing the authentication data and the reference data comprises:
when the authentication data match the reference data, permitting the host computer to access the portable electronic device; and
when the authentication data do not match the reference data, blocking the host computer from accessing the portable electronic device.

8. The authentication method of claim 1, wherein the step of generating the first data comprises:
randomly generating the first data.

9. A controller of a portable electronic device, comprising:
a first circuit, for generating first data;
a second circuit, coupled to the first circuit, for generating seed data by using formula $$InSeed'[i] = InData\left[i << C1 + C2 + \left(\sum_{k=i<<C1}^{(i<<C1)+C2} InData[k]\right) \text{Mod}(C2)\right],$$

and generating reference data according to the seed data, wherein InSeed'[i] is the seed data, InData[ ] is the first data, C1 is a constant, C2 is a number of bytes of the random data, and i=0, 1, 2, . . . , (C2-1); and
a third circuit, coupled to the second circuit, for receiving second data from a host computer and determining whether the host computer is permitted to access data stored in the portable electronic device according to the reference data and the second data.

10. The controller of claim 9, wherein the second circuit generates the reference data by using formula
RefData[k]=(Nibble_Swap(InSeed'[k])*C3-k), wherein RefData[k] is the reference data, C3 is a constant, Nibble_Swap( ) is a nibble swap operator, and k =0, 1, 2, . . . , (C2-1).

11. The controller of claim 9, wherein the third circuit derives an authentication data according to the second data, and determines whether the host computer is permitted to access the portable electronic device by comparing the authentication data and the reference data.

12. The controller of claim 11, wherein when the authentication data match the reference data, the third circuit permits the host computer to access the portable electronic device; and when the authentication data do not match the reference data, the third circuit blocks the host computer from accessing the portable electronic device.

13. The controller of claim 11, wherein the third circuit selects a portion of the second data to serve as the authentication data.

14. The controller of claim 13, wherein positions of the selected portion of the second data are determined by contents of the first data.

15. The controller of claim 13, wherein when the authentication data match the reference data, the third circuit permits the host computer to access the portable electronic device; and when the authentication data do not match the reference data, the third circuit blocks the host computer from accessing the portable electronic device.

16. The controller of claim 9, wherein the first circuit randomly generates the first data.

17. A host computer, which comprises a non-transitory storage medium storing a computer program utilized for accessing a portable electronic device, wherein when the computer program is executed by the host computer, the host computer operates to perform the following steps:
receiving first data from the portable electronic device;
deriving authentication data according to the first data;
generating second data according to the authentication data; and
transmitting the second data to the portable electronic device, wherein the second data are referenced by the portable electronic device to determine whether the host computer is permitted to access the portable electronic device;
wherein the step of deriving the authentication data according to the first data comprises:
generating seed data by using formula $$InSeed[i] = InData\left[i << C1 + C2 + \left(\sum_{k=i<<C1}^{(i<<C1)+C2} InData[k]\right) \text{Mod}(C2)\right],$$

wherein InSeed[i] is the seed data, InData[ ] is the first data, C1 is a constant, C2 is a number of bytes of the seed data, and i=0, 1, 2, . . . , (C2-1); and
generating the authentication data according to the seed data.

18. The host computer of claim 17, wherein positions of the selected portion of the first data are determined by contents of the first data.

19. The host computer of claim 17, wherein the step of generating the second data according to the authentication data comprises:
generating random data;
selecting a portion of the random data; and
replacing the selected portion of the random data by the authentication data to generate the second data.

20. The host computer of claim 19, wherein positions of the selected portion of the random data are determined by contents of the first data.

* * * * *